United States Patent
Zhang et al.

(10) Patent No.: US 10,527,706 B1
(45) Date of Patent: Jan. 7, 2020

(54) LOCALIZATION METHODS AND SYSTEMS FOR AUTONOMOUS SYSTEMS

(71) Applicant: Great Wall Motor Company Limited, Baoding (CN)

(72) Inventors: Kai Zhang, Carmel, IN (US); Vladimir Djapic, West Bloomfield, MI (US)

(73) Assignee: Great Wall Motor Company Limited, Baoding (CN)

( * ) Notice: Subject to any disclaimer, the term of this patent is extended or adjusted under 35 U.S.C. 154(b) by 0 days.

(21) Appl. No.: 16/279,415

(22) Filed: Feb. 19, 2019

(51) Int. Cl.
| | |
|---|---|
| H04W 24/00 | (2009.01) |
| G01S 5/00 | (2006.01) |
| G05D 1/02 | (2006.01) |
| H04W 4/46 | (2018.01) |
| H04W 4/02 | (2018.01) |
| H04W 88/02 | (2009.01) |
| H04M 1/725 | (2006.01) |

(52) U.S. Cl.
CPC .......... *G01S 5/0072* (2013.01); *G05D 1/0285* (2013.01); *H04W 4/023* (2013.01); *H04W 4/46* (2018.02); *H04M 1/72519* (2013.01); *H04M 1/72522* (2013.01); *H04W 88/02* (2013.01)

(58) Field of Classification Search
USPC .................... 455/456.2, 414.1, 550.1; 705/35
See application file for complete search history.

(56) References Cited

U.S. PATENT DOCUMENTS

| | | | |
|---|---|---|---|
| 2010/0318436 A1* | 12/2010 | Jain ................... | G06Q 10/06375 705/26.61 |
| 2012/0030254 A1* | 2/2012 | Miyazaki .............. | G06F 16/738 707/805 |
| 2014/0229258 A1* | 8/2014 | Seriani .................. | G06Q 30/08 705/14.23 |
| 2014/0258000 A1* | 9/2014 | Connolly ........... | G06Q 30/0275 705/14.71 |
| 2015/0161695 A1* | 6/2015 | Koby ................. | G06O 30/0282 705/26.4 |
| 2016/0210671 A1* | 7/2016 | Seljan ................ | G06Q 30/0275 |
| 2017/0203950 A1* | 7/2017 | Dickens ............... | B67D 3/0016 |
| 2017/0256012 A1* | 9/2017 | Buzalja ................ | G06Q 50/188 |
| 2018/0204250 A1* | 7/2018 | Watine ............... | G06Q 30/0275 |
| 2018/0218410 A1* | 8/2018 | Arora ................. | G06Q 30/0275 |

\* cited by examiner

*Primary Examiner* — Danh C Le
(74) *Attorney, Agent, or Firm* — Young Basile Hanlon & MacFarlane, P.C.

(57) ABSTRACT

A localization system uses an auction-based cooperative localization method to determine local pose estimations or local pose state corrections. The auction-based cooperative localization method is triggered by receipt of relative position measurements by a member of a cooperative and is cooperatively processed by a bid winning member of the cooperative, where the cooperative refers to a collection of autonomous vehicles and passengers with location/position determinable devices that are in communication with each other for the purposes of sharing localization data, position data and the like. The bid winning member determines local pose estimations or local pose state corrections for itself and provides local pose estimations or local pose state corrections to the other members of the cooperative.

18 Claims, 12 Drawing Sheets

LOCALIZATION METHODS AND SYSTEMS FOR AUTONOMOUS SYSTEMS

TECHNICAL FIELD

This disclosure relates to autonomous systems including vehicles and passengers. More specifically, this disclosure relates to localization methods for autonomous vehicles and passengers when radio-navigation-satellite service (RNSS) data is unavailable.

BACKGROUND

Autonomous vehicles (AVs) exploring in an unknown environment are made to face many challenges while navigating in a planned or unplanned trajectory to reach their destination. Many AV tasks rely on accurate knowledge of their position and orientation in space. Localization is the process of determining an AV's position accurately on the surface of the earth. AVs compute estimates of their poses (i.e. the combination of position and orientation) based on available absolute and relative measurements. Absolute measurements generally rely on the availability of radio-navigation-satellite services (RNSS) systems such as Global Positioning System (GPS), GLONASS, Galileo, and Bei-Dou.

When RNSS data is not available due to environmental or structural interference, such as in outdoor parking lots, indoor parking structures, tunnels, and canyons, other technologies may be used to obtain relative measurements. For example, these technologies may include ultrasonic positioning systems, ultra-wideband systems, dedicated short-range communications systems (DSRC), cellular systems, AM/FM radio, satellite communications, digital television, Wi-Fi, light detection and ranging (LiDAR), radar, video imaging, or combinations thereof. Cellular, AM/FM radio, satellite communications, digital television, and Wi-Fi. Cellular, AM/FM radio, satellite communication, digital television (HDTV), Wi-Fi are known as signals of opportunity (SOP), ambient signals not intended for positioning, navigation, and timing. AVs are assumed to be equipped, at a minimum, with RNSS and SOP receivers, microelectromechanical systems (MEMS) inertial measurement unit (IMUs), wheel speed sensors/wheel encoders/vehicle speed sensors (VSS) (collectively wheel sensors), processing hardware and software. AVs may also have cameras so that SOPs may further include available active sources of light such as street light, parking lot lights or structure/building lights.

Traditional approaches to address RNSS limitations have been to fuse RNSS receivers with dead-reckoning systems and map-matching algorithms. However, localization determined from multiple homogeneous or heterogeneous sensors may suffer from loss of high positioning accuracy, single point failure, and energy inefficiency, and communication delay and packet loss depending on the localization techniques employed.

SUMMARY

Disclosed herein are methods and systems for localization when radio-navigation-satellite service (RNSS) data is unavailable. A localization system uses an auction-based cooperative localization method to determine local pose estimations or local pose state corrections. The auction-based cooperative localization method is triggered by receipt of relative position measurements by a member of a cooperative and is cooperatively processed by a bid winning member of the cooperative, where the cooperative refers to a collection of autonomous vehicles and passengers with location/position determinable devices that are in communication with each other for the purposes of sharing localization data, position data and the like. The bid winning member determines local pose estimations or local pose state corrections for itself and provides local pose estimations or local pose state corrections to the other members of the cooperative.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
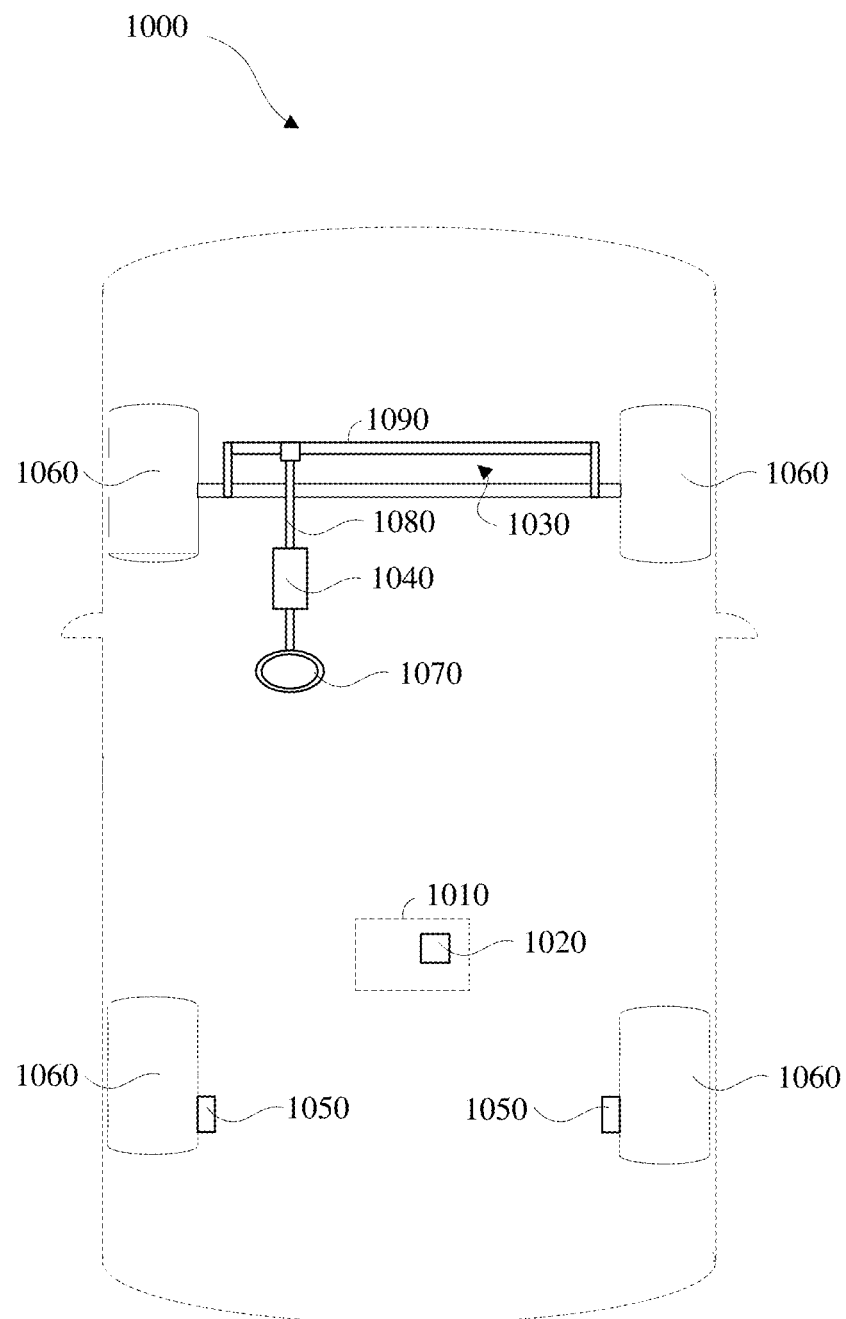
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Localization determination when radio-navigation-satellite service (RNSS) data is unavailable may rely on other sensors and technology to determine position. For example, these technologies may include ultrasonic positioning systems, ultra-wideband systems (UWB), dedicated short-range communications systems (DSRC), cellular systems, AM/FM radio, satellite communications, digital television, Wi-Fi, light detection and ranging (LiDAR), radar, video imaging, or combinations thereof. Signals of opportunity (SOP), which are ambient signals not intended for positioning, navigation, and timing, may include cellular, AM/FM radio, satellite communications, digital television, and Wi-Fi. These other technologies (which generally provide relative measurements) may be combined with RNSS (which generally provides absolute measurements) to determine localization.

AVs may be equipped with at least RNSS receivers, SOP receivers, microelectromechanical systems (MEMS) inertial measurement unit (IMUs), wheel speed sensors/wheel encoders/vehicle speed sensors (VSS), processing hardware and software. AVs may also have monocular cameras so that SOPs may further include available active sources of light such as street lights, parking lot lights or structure/building lights.

Figure 12:
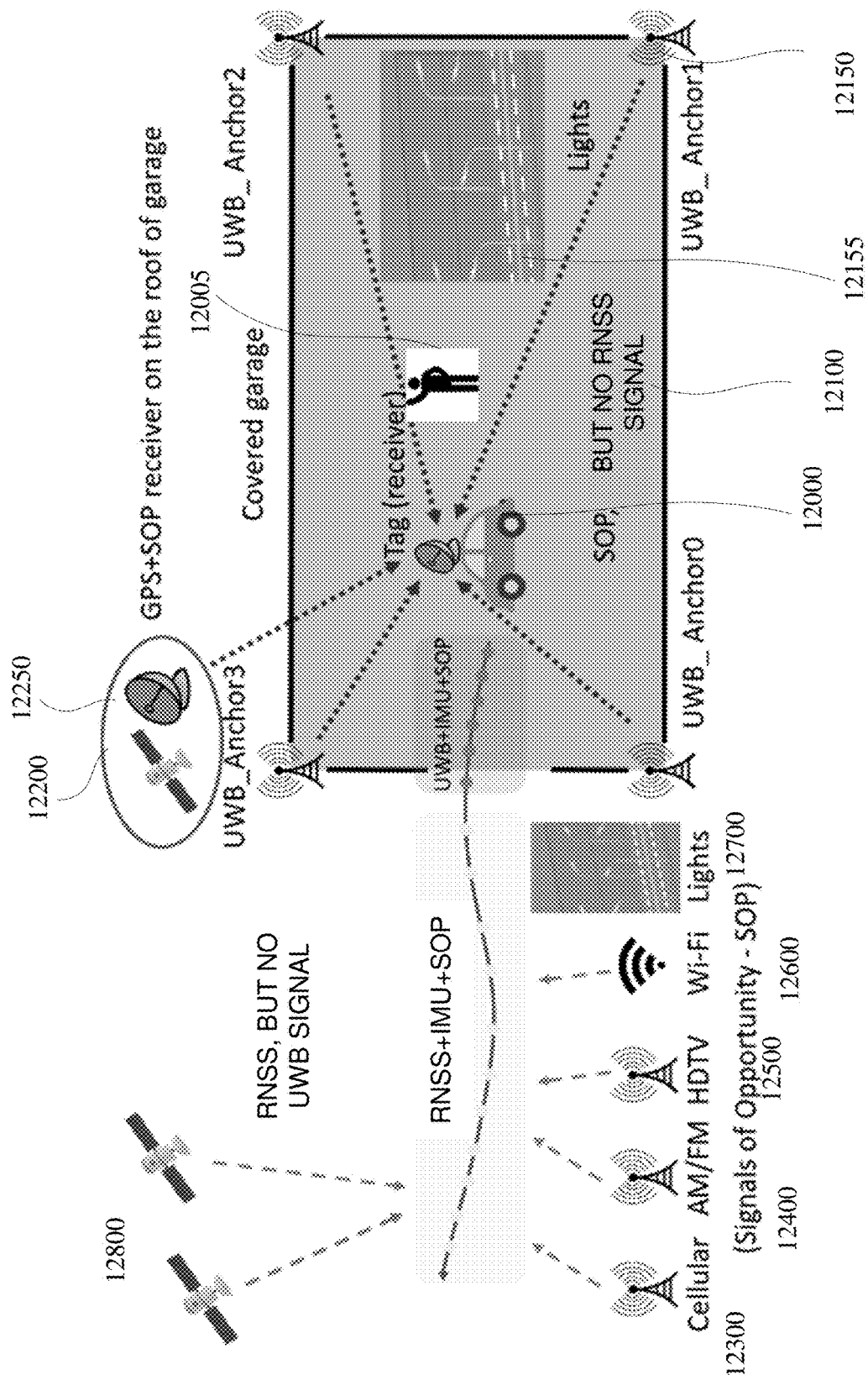
FIG. 12 is a block diagram of an example of scenarios in accordance with embodiments of this disclosure.

Example scenarios are shown in FIG. 12. For example, an AV 12000 may have multiple receivers including RNSS receivers, SOP receivers, UWB receivers, and sensors, and a passenger 12005 may a wireless device. Although localization of the AV 12000 is described herein, the description is applicable to localization of the passenger 12005 as appropriate. The AV 12000 may also have cameras and the like to detect lights and the like. In an example, the AV 12000 may be in a covered garage 12100 which may have a set of UWB anchors 12150 (UWB_Anchor0, UWB_Anchor1, UWB_Anchor2, UWB_Anchor3) and lights 12155. In this instance, the AV 12000 may determine localization from SOP signals received from the UWB anchors 12150, the lights 12155 and IMU measurements. In another example, the covered garage 12100 may include an RNSS receiver 12200 and SOP receiver 12250 on the roof. In this instance, the AV 12000 may determine localization from signals received from the UWB anchors 12150, the lights 12155, the RNSS receiver 12200, the SOP receiver 12250 and the IMU measurements. In these examples, the covered garage 12100 may perform as a base station (as described herein below) which may include RNNS receivers, SOP receivers or both. The base station may be time synchronized with AVs using wireless time synchronization methods.

In another example, the AV 12000 may now be in an outdoor parking lot which may include multiple SOP sources such as cellular 12300, AM/FM radio 12400, HDTV 12500, Wi-Fi 12600, and lights 12700, for example, and RNSS 12800. In one scenario, the AV 12000 may have access to the SOP sources but no access to RNSS 12800 due to tall surrounding buildings and localization may be determined from the SOP sources and IMU measurements. In another scenario, the AV 12000 may have access to the SOP sources and RNSS 12800 and localization may be determined from the SOP sources, RNSS 12800 and IMU measurements.

Traditional approaches to address RNSS limitations have been to fuse RNSS receivers with dead-reckoning systems and map-matching algorithms. Localization determined from multiple homogeneous or heterogeneous sensors may suffer from loss of high positioning accuracy, single point failure, energy inefficiency, communication delay and packet loss depending on the localization techniques employed. For example, in a centralized cooperative localization algorithm, a fusion center (FC), which is either a leader AV or a center, may oversee the localization operation for the team members in the cooperative. At each time step, the FC collects the individual motion measurements and AV-to-AV relative measurements to estimate each team members' poses or generate the update commands for each of the team members. Then, the FC sends back this information to each AV. Centralized operations suffer single point failure and energy inefficiency as the computation and communication costs scale poorly with respect to the number of AVs in the cooperative team. To avoid single point failure and the energy inefficiencies of central operations, decentralized cooperative localization methods distribute the computations of a central cooperative localization among the team members via tightly coupled cooperation or propagate the relative measurement by only two AVs via a loosely coupled cooperation. Decentralized cooperative localization methods lose high positioning accuracy for an increasing number of AVs, i.e. decentralized cooperative localization scales poorly with large numbers of AVs.

A localization system may use an auction-based cooperative localization method when an AV, for example, receives or obtains relative measurements from AV members in a cooperative. The relative measurements are cooperatively processed by a bid winning AV member of the cooperative. The bid-winning AV member determines pose estimations or update commands for itself and provides determined pose estimations or update commands to the other members. AV(s) may obtain and share information from SOPs so that a winning bid AV may detect and match observations from the various SOP sources to localize the AV(s). In an implementation, a map of the SOP sources may be automatically built from an offline sequence of RF base stations and camera images. In this implementation, the bid winning AV may detect and match observations from the various SOP sources to localize the AV(s) within this map.

FIG. 1 is a diagram of an example of a vehicle 1000 in accordance with embodiments of this disclosure. The vehicle 1000 may be an autonomous vehicle (AV) or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example, a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is, therefore, less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
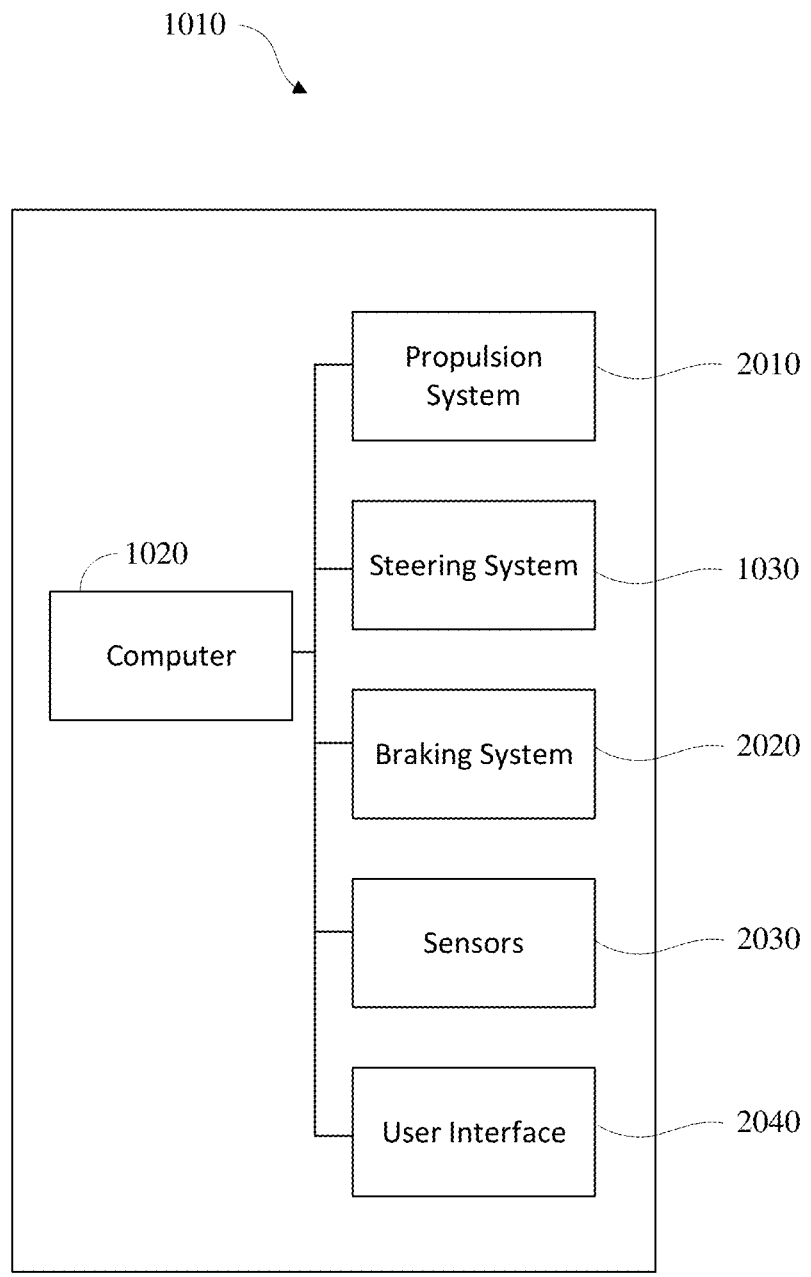
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning off the road wheels 1060. The steering column 1080 may be coupled to the steering rack 1090 via a rack-and-pinion, that is, gear meshing between the pinion gear and rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, a ring laser, or fiber-optic gyroscopes; inertial measurements units (IMU); and magnetometers. The sensors 2030 may detect the external world, for example, radar sensors, scanning laser rangefinders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
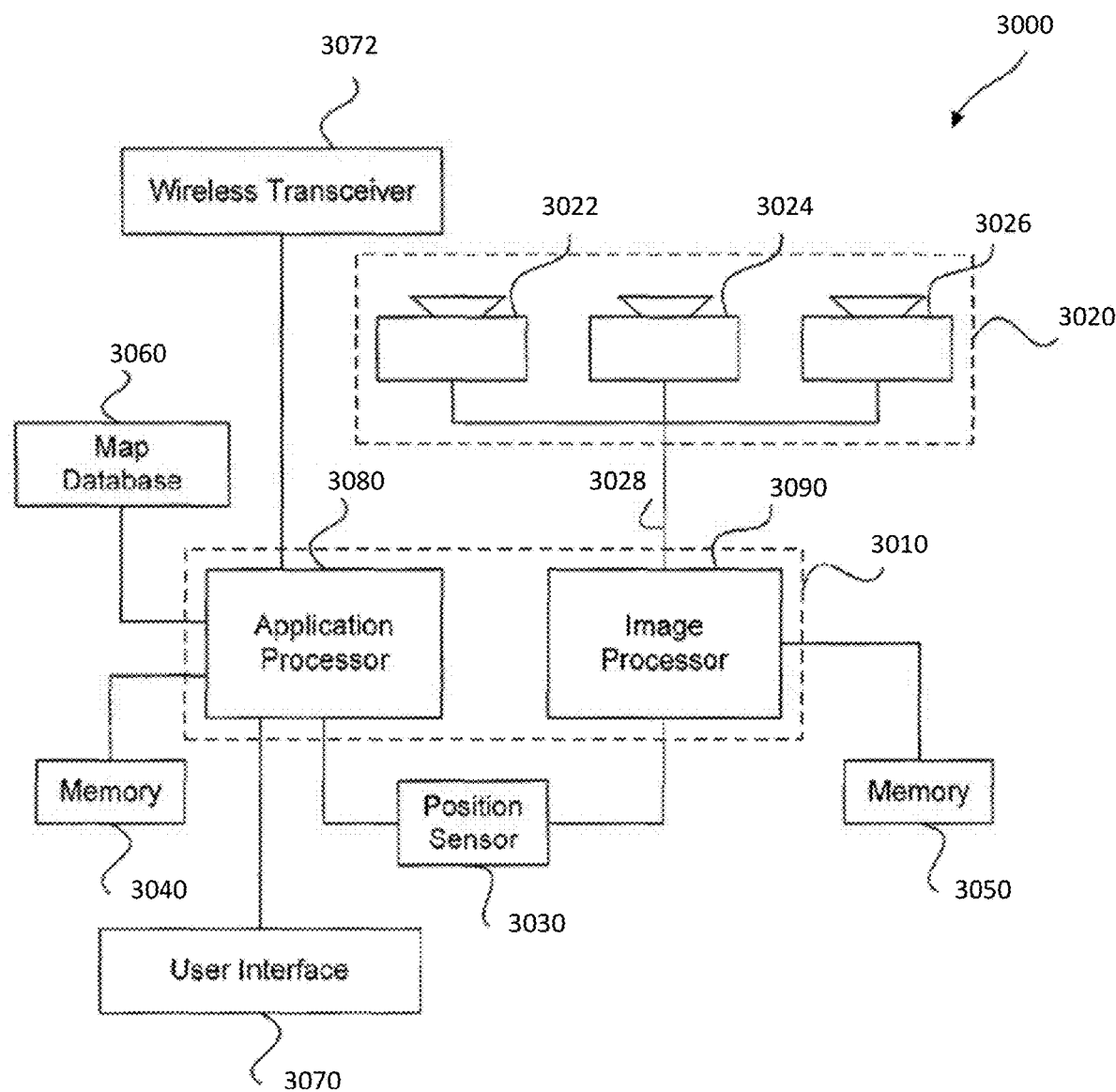
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, an image capture device 3024, an image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, the central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 3 depicts two separate processing devices included in the processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock, and input-output circuits. The memory may store software that, when executed by the processor, controls the operation of the system. The memory may include databases and image processing software. The memory may comprise any number of random access memories, read-only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of the vehicle control system 3000. These memory units may include various databases and image processing software, as well as a trained system, such as a neural network, or a deep neural network, for example. The memory units may include random access memory, read-only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of the vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from LIDAR or stereo processing of two or more images) of the environment may be processed together with position information, such as a GPS coordinate, vehicle's ego-motion, etc. to determine a current location of the vehicle relative to the known landmarks, and refine the vehicle location.

User interface 3070 may include any device suitable for providing information to or for receiving inputs from one or more users of the vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to the vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items but also descriptors relating to those items, including, for example, names associated with any of the stored features. In some embodiments, map database 3060 may be physically located with other components of the vehicle control system 3000. Alternatively or additionally, map database 3060 or a portion thereof may be located remotely with respect to other components of the vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information or related information received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
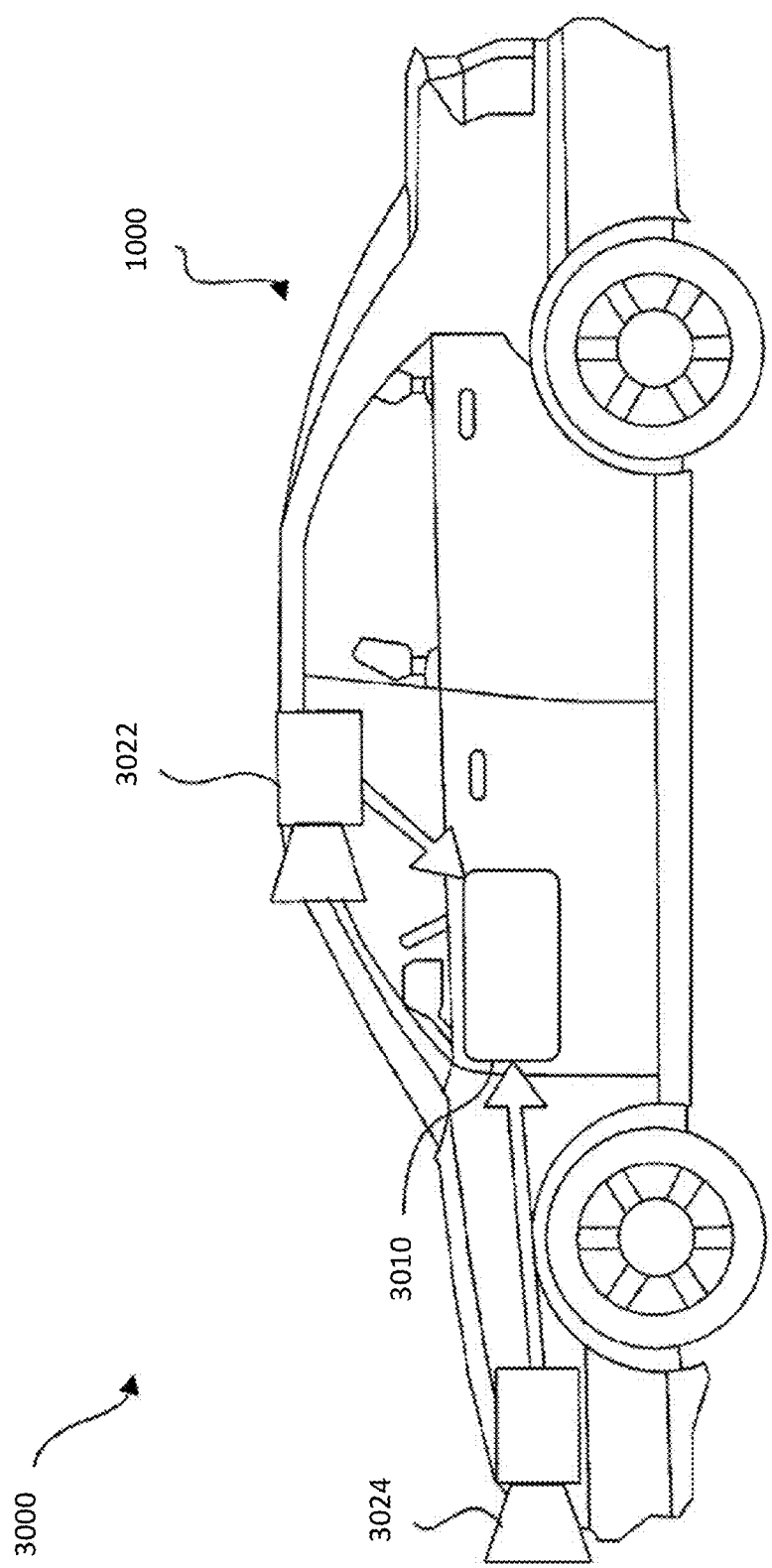
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of the vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an automated driving system imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of the vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/or receive data over one or more networks (e.g., cellular networks, the Internet, etc.). For example, wireless transceiver 3072 may upload data collected by the vehicle control system 3000 to one or more servers, and download data from the one or more servers. Via wireless transceiver 3072, vehicle control system 3000 may receive, for example, periodic or on-demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by a user via, for example, wireless transceiver 3072, be initialized by factory default settings, or by data received by wireless transceiver 3072.

Figure 5:
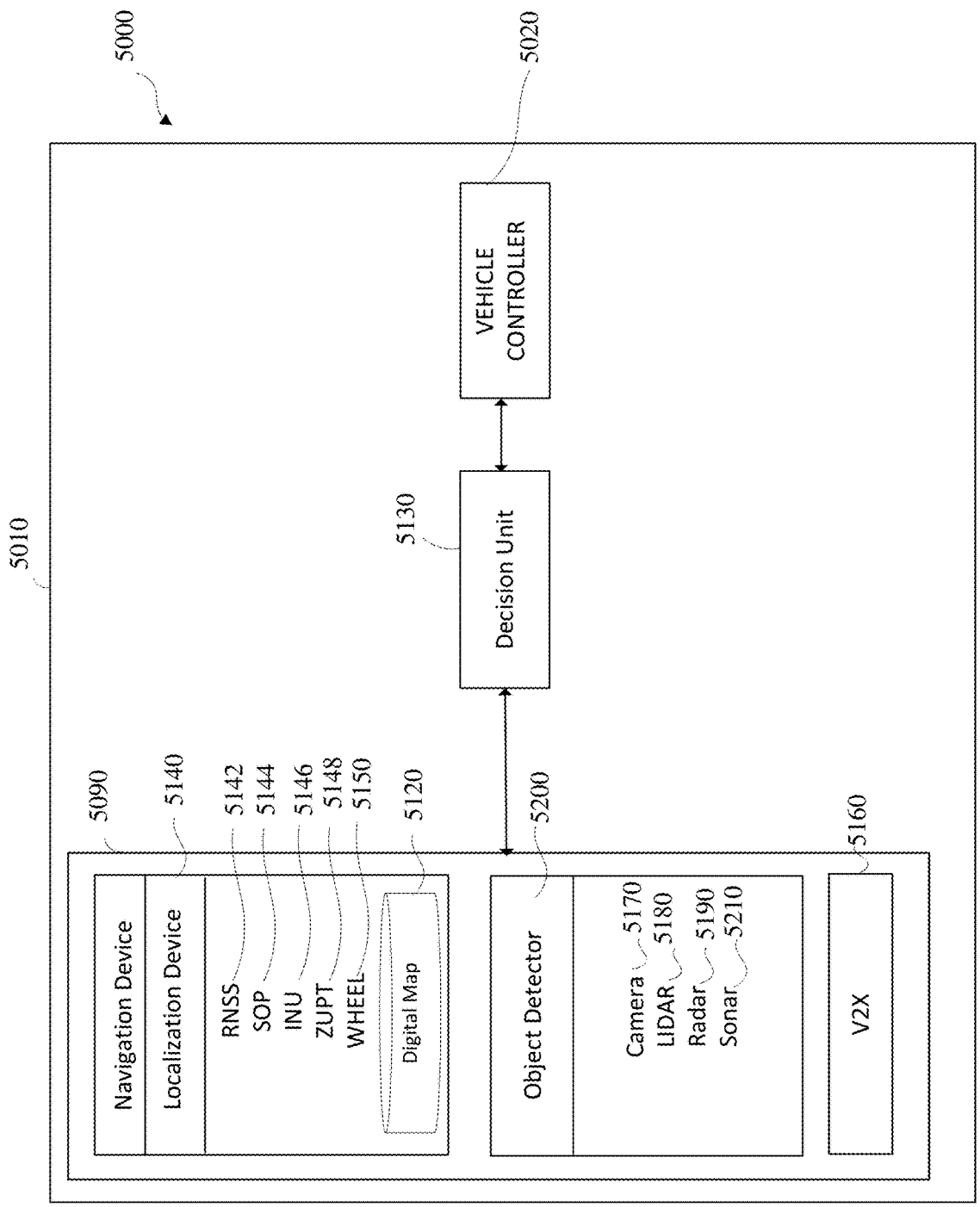
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle in 5010.

Referring to FIG. 5, the vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140, such as a GPS/GNSS receiver 5142, SOP receiver 5144, an inertial measurement unit (IMU) 5146, wheel 5148 and zero velocity update (ZUPT) 5150. A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part provided by way of V2I communications, V2V communications, vehicle-to-pedestrian (V2P) communications, or a combination thereof, which may generically be labeled as V2X communications 5160. The navigation device 5090, localization device 5140, or both may include a processor(s) such as a microprocessor or other control circuitry such as analog circuitry, digital circuitry, or both, including an application specific integrated circuit (ASIC) for processing data. The navigation device 5090, localization device 5140, or both may include a memory, including a non-volatile memory, such as electrically erasable programmable read-only memory (EEPROM) for storing one or more routines, thresholds, captured data, or a combination thereof.

In some implementations, an object detector 5200 may include the sonar unit 5210, the camera 5170, the LIDAR unit 5180, and the radar unit 5190. The object detector 5200 may be used to detect the relative location of another entity and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include a processor(s) such as a microprocessor or other control circuitry such as analog circuitry, digital circuitry, or both, including an application specific integrated circuit (ASIC) for processing data. The decision unit 5130 may include a memory, including a non-volatile memory, such as electrically erasable programmable read-only memory (EEPROM) for storing one or more routines, thresholds, captured data, or a combination thereof. The decision unit 5130 may determine or control route or path planning, local driving behavior, and trajectory planning for the host vehicle 5010.

The vehicle system architecture 5000 includes a vehicle controller or trajectory tracker 5020 that is in communication with the decision unit 5130. The vehicle controller 5020 may execute a defined geometric path by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including a non-volatile memory, such as electrically erasable programmable read-only memory (EEPROM) for storing one or more routines, thresholds, captured data, or a combination thereof.

The host vehicle 5010 may operate in an automated mode where a human operator is not needed to operate the vehicle 5010. In the automated mode, the vehicle control system 5000 (using, for example, the vehicle controller 5020, the decision unit 5130, navigation device 5090, the object detector 5200 and the other described sensors and devices) autonomously controls the vehicle 5010. Alternatively, the host vehicle may operate in a manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

Figure 6:
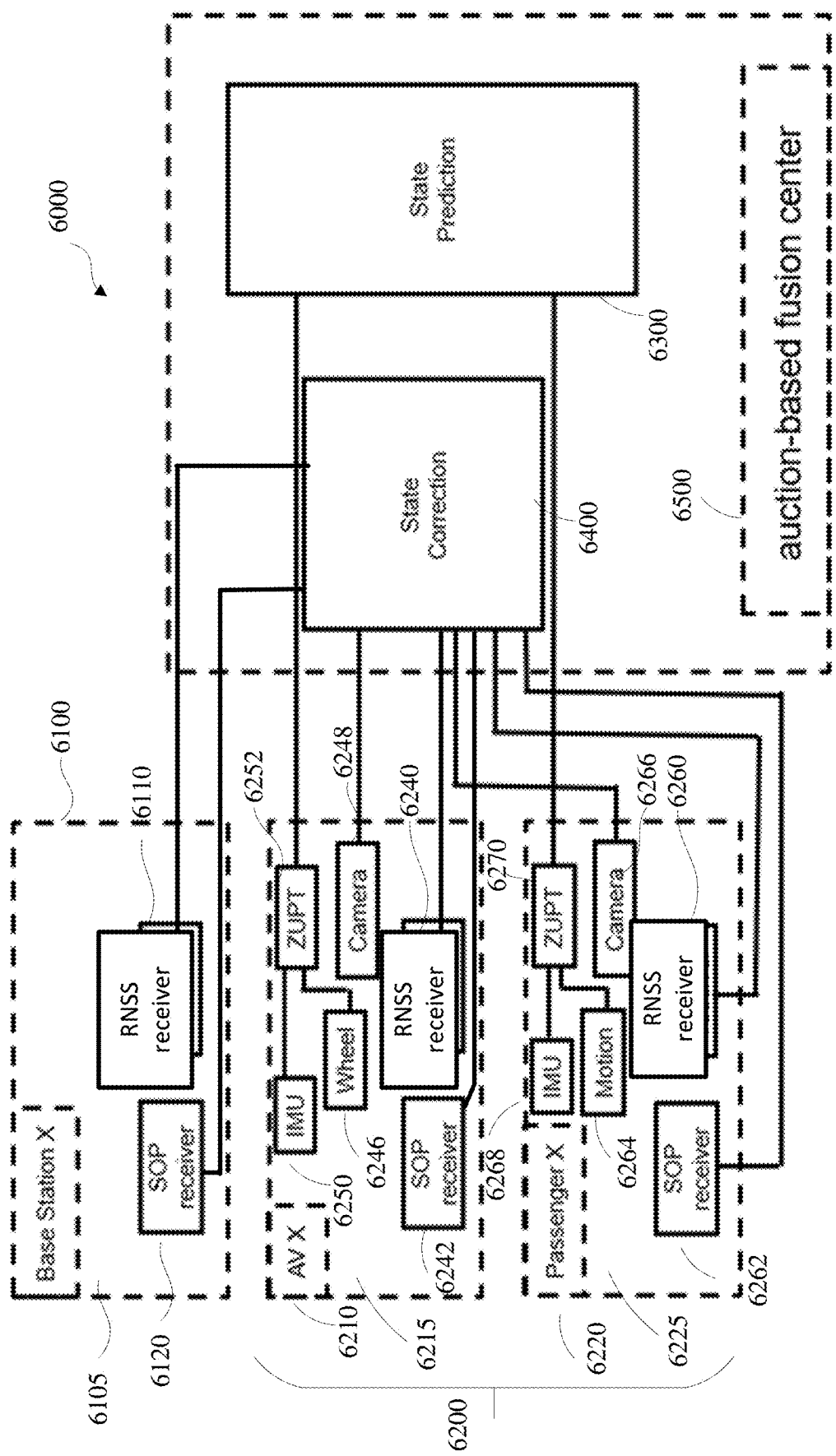
FIG. 6 is a diagram of an example of a general framework for localization in accordance with embodiments of this disclosure.

FIG. 6 is a diagram of an example of a general framework and system 6000 for localization in accordance with embodiments of this disclosure, which may be implemented in part with the navigation device 5090, localization device

5140, map 5120 and the V2X 5160 of FIG. 5. The system 6000 includes one or more base station(s) 6100 and one or rover(s) 6200. In an implementation, the base station 6100 may be placed on a building, structure or the like. In an implementation, the base station 6100 includes a localization device or unit 6105 in addition to other functionality described herein but not shown for purposes of clarity. The localization device 6105 may include RNSS receivers 6110, and SOP receivers 6120. For example, the base station 6100 may be equipped with multiple cellular omnidirectional antennas. The antennas may be used to receive cellular signals, such as, but not limited to, for example, a cell-specific reference signal (CRS) long-term evolution (LTE) signals at multiple different carrier frequencies (for example, 2145 MHz, 1955 MHz, 751 MHz, and 739 MHz), which are used by LTE cellular providers. In an implementation, the base station 6100 may jointly estimate the time-of-arrival (TOA) and azimuth and elevation angles based on the direction-of-arrival (DOA) from the received cellular long-term evolution (LTE) signals, for example, or other SOPs. The base station 6100 also obtains pseudo-range measurements to nearby SOP nodes or sources (multiple nodes). The RNSS receivers 6110 may receive RNSS signals (with differential corrections, such as real-time kinematics RTK) or precise point positioning (PPP)) and may accurately estimate its own position.

The rover 6200 may be an AV 6210 or a passenger with a cell phone or like device (passenger 6220), where each type of rover 6200 includes a localization device or unit in addition to other functionality described herein but not shown for purposes of clarity. The rover 6200 may be a roaming AV, semi-autonomous AV, human driven vehicle, passenger with position/location determinable device, or any combination thereof, which includes one or more of the sensors described herein to determine position or location, and which shares one or more signals received by the one or more sensors with other rover(s) 6200 so that cooperative localization may be performed. For example, the rover 6200 may navigate indoors (or in any place where RNSS signals are degraded or unavailable), while receiving signals from the same SOP nodes or sources that the base station 6100 is tracking and obtaining pseudo-range measurements to these SOP nodes. The effect of the SOP's clock biases may be removed by subtracting the pseudo-range measurements of the base station 6100 and rover 6200 and adding a known mapped range to generate the pseudo-range measurement.

The AV 6210 type of rover 6200 includes a localization device 6215 which may have RNSS receivers 6240, SOP receivers 6242, wheel sensors 6246, a camera 6248, an IMU 6250, a zero velocity update (ZUPT) device 6252 and other sensors that may receive signals for aiding localization determination. The measurements from the IMU 6250 and the wheel sensors 6246 are filtered through the ZUPT device 6252.

The passenger 6220 type of rover 6200 includes a localization device 6225 which may have RNSS receivers 6260, SOP receivers 6262, motion sensors 6264, a camera 6266, an IMU 6268, a zero velocity (ZUPT) device 6270 and other sensors that may receive signals for aiding localization determination. The measurements from the IMU 6268 and the motion sensors 6264 are filtered through the ZUPT device 6270.

In general, local pose estimation for each rover 6200 may include pose state prediction 6300 and pose state correction or update 6400. As described herein, a combination of SOPs with low-cost micro-electro-mechanical system (MEMS) IMUs, electromagnetic, and barometric sensors may be used to facilitate these computations.

The pose state prediction 6300 relies on measurement information from the IMU 6250 and the wheel sensors 6246 as processed by the ZUPT device 6252 when the rover 6200 is an AV 6210 type rover and relies on measurements from the IMU 6268 and the motion sensors 6264 as processed by the ZUPT device 6270 when the rover 6200 is a passenger 6220 type rover, to propagate the state of the rover 6200.

Although IMUs and inertial navigation units may be used for pose state prediction, these type of devices do not provide position measurements but are based on other measurements which may be used to compute position. Consequently, there is a margin of error associated with these predictions which need to be corrected. The pose state correction or update 6400 may use measurements from SOPs to correct these errors in the absence of RNSS signals. Collaborating or cooperative rover(s) 6200 may share information gathered from SOPs to improve INS error corrections when determining local pose estimation.

The localization device of each of the rover(s) 6200 includes an auction-based fusion center 6500 which uses an auction-based cooperative localization method to compute estimates of the poses of the rover(s) 6200 or correction updates for the rover(s) 6200 as appropriate. The auction-based fusion center 6500 addresses the issues of single point failure, energy inefficiency, achieves high positioning accuracy and scales with increasing numbers of rovers 6200. As described below, the auction-based fusion center 6500 may select an auctioneer either on a random basis or using some other metric. The auctioneer may then gather or collect bids from the rovers 6200 in the cooperative team and allocate the local pose estimation task to the winning bidder. The term cooperative refers herein to a collection of rovers that are in communication with each other for the purposes of sharing localization data, position data, and the like, for cooperatively determining pose estimations or correction updates for each rover in the cooperative.

The computations of a feasible cooperative localization are auctioned among team members, e.g., the rovers. The auction-based cooperative localization method uses relative measurements from team members to jointly estimate the poses or determine correction updates for all team members. This increases the pose estimation accuracy for all team members. The auction-based cooperative localization method relies on correlations existing between the team members' pose states due to the fusing of the relative measurements. The correlations are not maintained explicitly but are accounted in an implicit manner using auctioneer consistent estimates of the joint covariance of the team members.

In the auction-based cooperative localization method, each rover or team member (AV or passenger, for example) maintains its local pose estimation and is propagated using self-motion measurements (wheel, IMU etc) and corrected or updated locally if occasional absolute measurements become available, e.g., through occasional access to RNSS signals. In the event a rover takes a relative measurement from available rover(s) in the cooperative, the relative measurements are processed cooperatively by one of the rovers involved using the rover's current propagated pose state and covariance matrices based on the available computational and communication resources.

Figure 7:
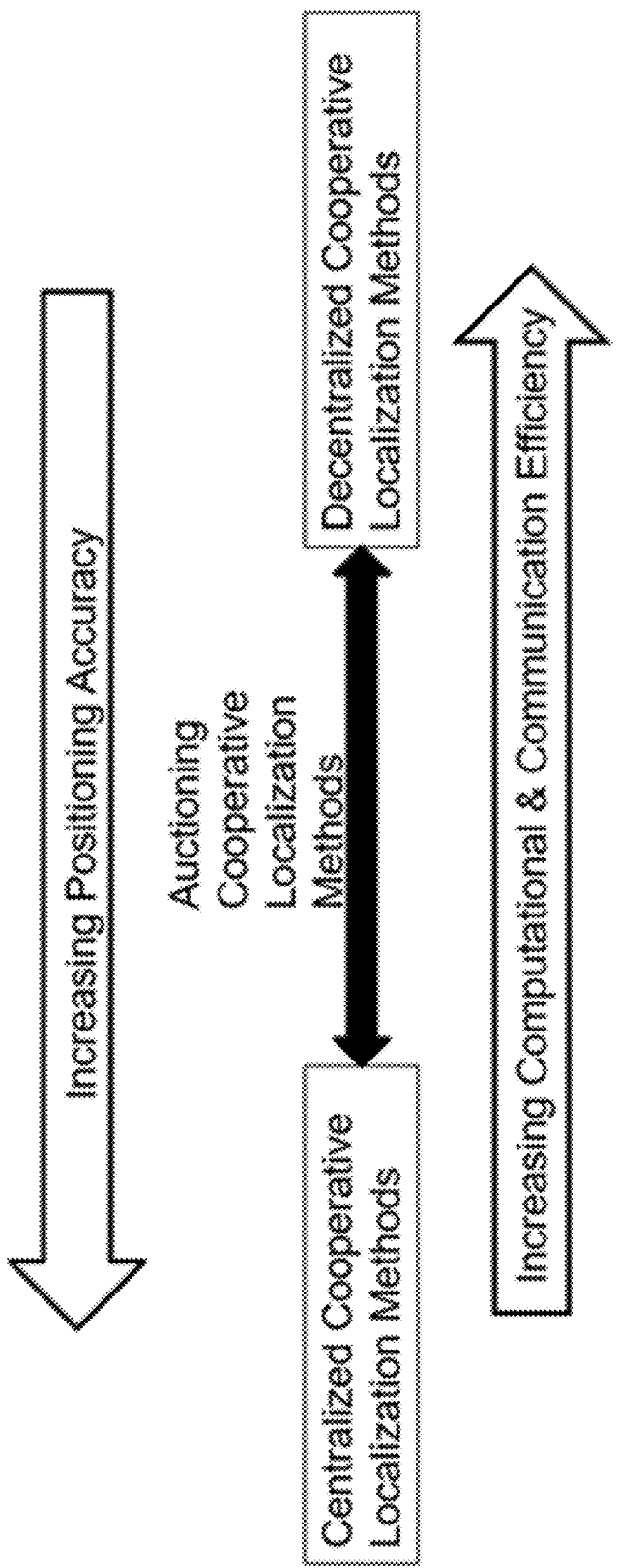
FIG. 7 is a block diagram of example trade-offs between different cooperative localization methods in accordance with embodiments of this disclosure.

Each rover bids on tasks of local pose estimation and the tasks are then allocated to each rover through the auctioneer using winner determination methods as are known in auctioning. As shown in FIG. 7, the auction-based cooperative localization method balances the trade-off between purely centralized cooperative localization methods which require a central controller and a purely decentralized cooperative localization method without any communication or limited to 2 rovers in communication when dealing with multiple homogeneous or heterogeneous sensors with multiple rovers, both in terms of communication efficiency, computation efficiency, and the quality of the solution.

Figure 8:
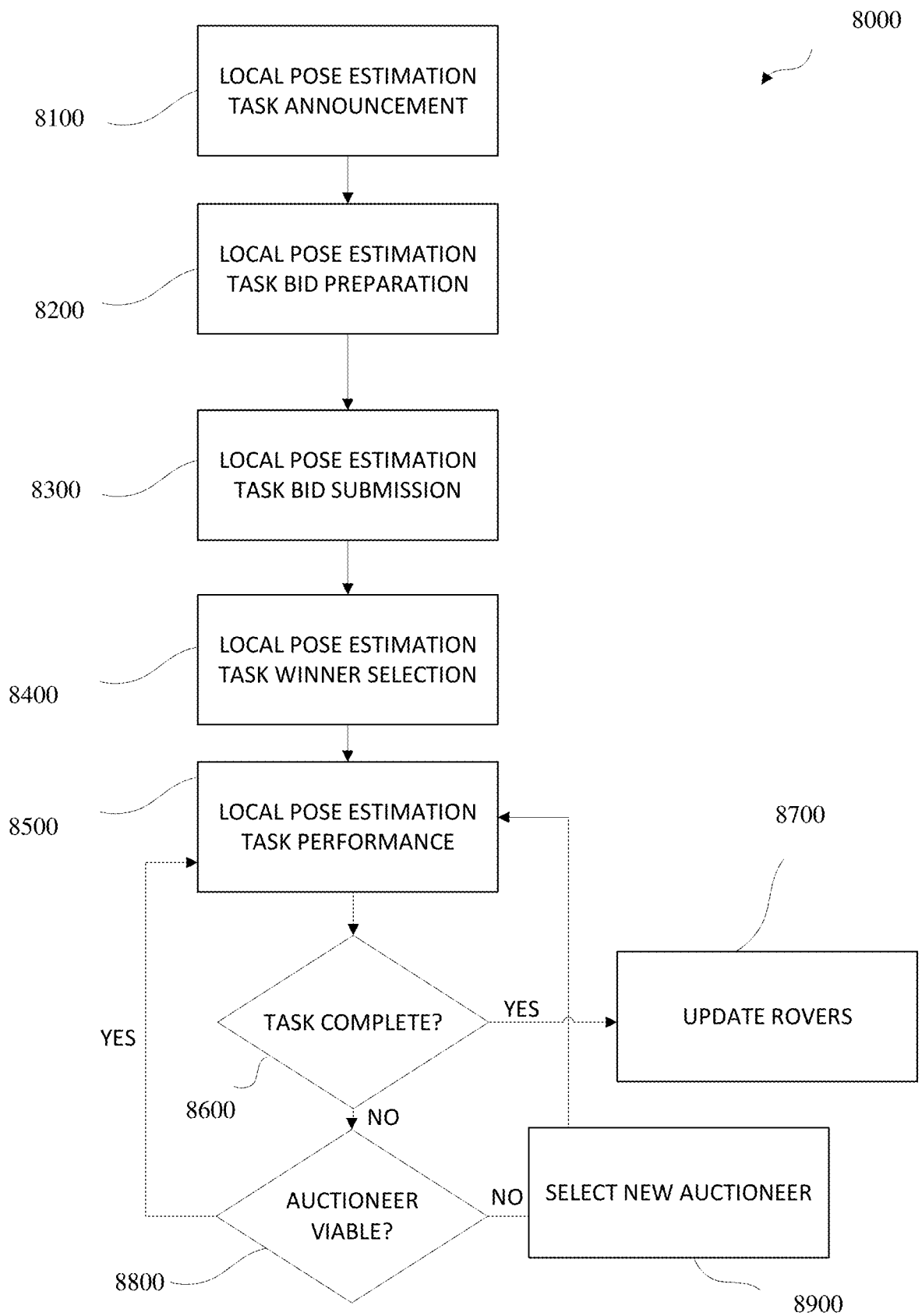
FIG. 8 is a flowchart of an example method for localization in accordance with embodiments of this disclosure.

FIG. 8 is a diagram of an example of a technique or method 8000 for localization in accordance with embodiments of this disclosure. The method 8000 includes: announcing 8100 a local pose estimate task triggered by availability of relative measurements; preparing 8200 a bid for the local pose estimate task; submitting 8300 the bid; selecting 8400 a winning bid; performing 8500 the local pose estimation task; monitoring 8600 progress of the local pose estimate task by the winning bidder; determining 8600 viability of auctioneer; updating 8700 the rovers in the rover cooperative with the appropriate pose or correction/update command; determining 8800 viability of the auctioneer; and selecting 8700 a new auctioneer. For example, the technique 8000 may be implemented, as applicable and appropriate, by the localization unit 6215 of FIG. 6, the localization unit 6225 of FIG. 6, the localization device 5140 shown in FIG. 5, the navigation device 5090 shown in FIG. 5, the V2X 5160, the map 5120, the control system 1010 shown in FIG. 1, the processor 1020 shown in FIG. 1 or FIG. 2 or the processing unit 3010 shown in FIG. 3 or FIG. 4.

Figure 10:
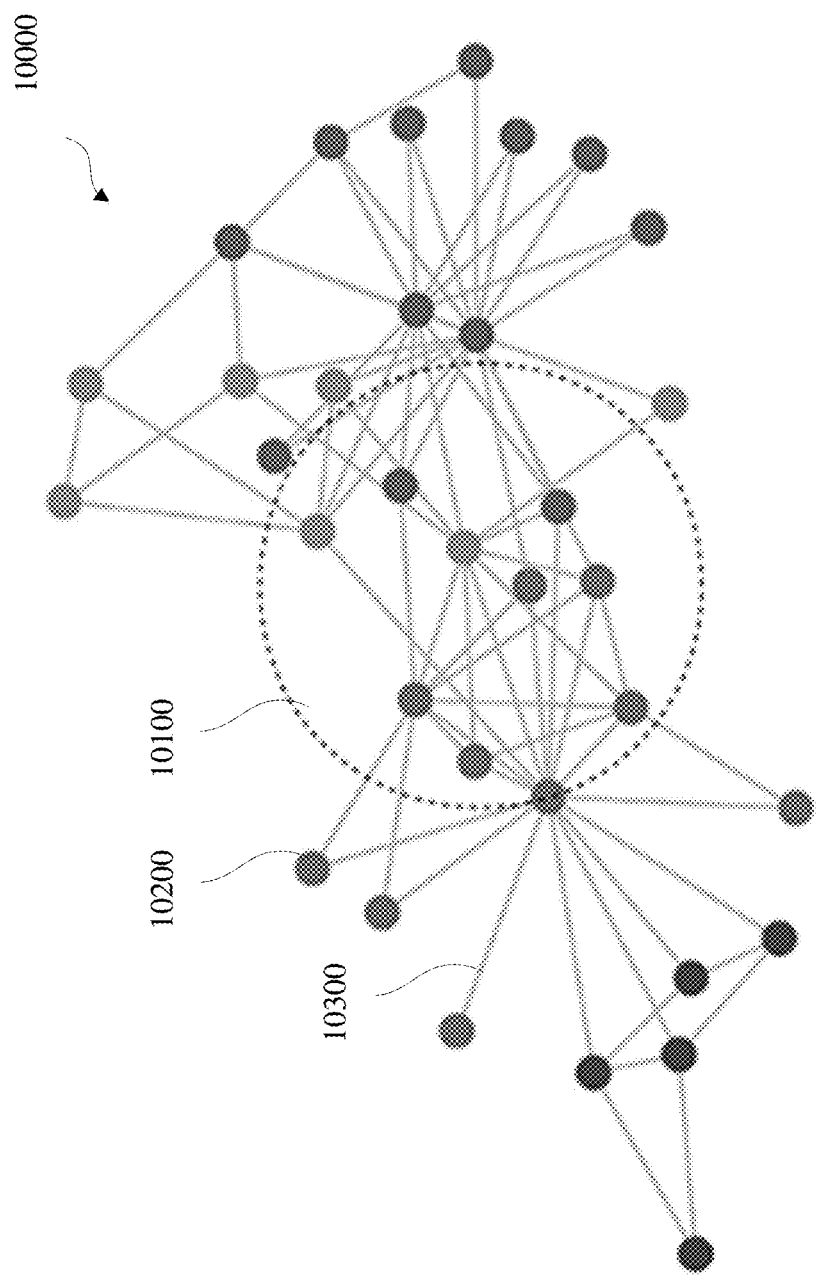
FIG. 10 is a diagram of an example of auctioneer selection criteria in accordance with embodiments of this disclosure.

The method 8000 includes announcing 8100 a local pose estimation task triggered by the availability of relative measurements. In an implementation, the announcing 8100 may include selecting an auctioneer. In an implementation, the auctioneer may be randomly selected from members of a rover cooperative, where a rover cooperative refers herein to a collection of rovers that are in communication with each other for the purposes of sharing localization data, position data, and the like, for cooperatively determining pose estimations or correction/update commands for each rover in the cooperative. For example, as shown in FIG. 10, the auctioneer may be assigned randomly inside the dashed circle 10100 of a rover cooperative 10000. Each node 10200 may represent a rover (an AV or passenger) in a cooperative or fleet and a link 10300 represents communication amongst the nodes. The dashed circle may represent a geometrical center area of the fleet and its radius may shrink or grow based on the dynamic environment and fleet size. In an implementation, the assignment may be done using, for example, a token or like system. In the event of a communication loss (determined relative to a threshold) due to computation delay or loss, communication delay or loss, or both, the auctioneer may be deemed unavailable or dead, and a new auctioneer may be assigned randomly. In an implementation, the auctioneer may be rotated amongst the members of the rover cooperative using, for example, a token or like system. In an implementation, the announcing 8100 may include collecting or gathering the information relevant to the local pose estimation task. For example, the auctioneer may offer tasks of the individual motion measurements, and rover-to-rover relative measurements in a bid package. The bidding package may also contain computation and communication capabilities required by a winning bidder. In an implementation, the computation and communication capabilities may account for communication delay and packet loss. In an implementation, the bid package may be sent in a message. In an implementation, the members of the rover cooperative may be known to each other using known techniques.

The method 8000 includes preparing 8200 a bid for the local pose estimate task. The preparing 8200 may include accepting the bidding package or message by rovers that are in an idle or explore state. Since the rover cooperative may comprise heterogeneous rovers that have different capabilities, each rover may compare their own capabilities with the capabilities required for the task. In an implementation, rovers capable of meeting the requirements bid on the local pose estimation task.

The method 8000 includes submitting 8300 the bid. After evaluating the cost, participating rovers submit bids to the auctioneer.

The method 8000 includes selecting 8400 a winning bid. The auctioneer evaluates the submitted bids, announces the winner, and awards the task for local pose estimation which includes estimating poses or generating update commands (i.e., pose state correction) for rovers in the cooperative. The auctioneer then closes the auction. In an implementation, the auctioneer may send a message identifying the winning bid. In an implementation, the other rovers may return to an explore state and start searching for new tasks.

The method 8000 includes performing 8500 the local pose estimation task. In an implementation, the task for local pose estimation includes estimating poses or generating update commands (i.e., pose state correction) for rovers in the cooperative.

The method 8000 includes monitoring 8600 progress of the local pose estimate task by the winning bidder. That is, determining if the local pose estimate task is complete. In an implementation, the auctioneer monitors the progress of the winning rover. In an implementation, the auctioneer periodically sends messages to the winning rover until the auctioneer dies due to computation or/and communication delay or loss.

The method 8000 includes updating 8700 the rovers in the rover cooperative with the appropriate pose or update command. In an implementation, the completed local pose estimation task may be used to determine where to pick up a passenger in a parking lot or find a parked AV.

The method 8000 includes determining 8800 viability of the auctioneer. In an implementation, a determination is made as to whether there is a communication loss (determined relative to a threshold) with respect to a current auctioneer. The loss of communication may be due to one of or a combination of computation delay, computation loss, communication delay, communication loss, and the like.

The method 8000 includes selecting 8900 a new auctioneer when a current auctioneer dies due to computation or/and communication delay or loss. In an implementation, the auctioneer may be randomly selected from rovers of a rover cooperative. For example, as shown in FIG. 10, the auctioneer may be assigned randomly inside the dashed circle 10100 of a rover cooperative 10000. Each node 10200 may represent a rover (an AV or passenger) in a cooperative or fleet and a link 10300 represents communication amongst the nodes. The dashed circle may represent a geometrical center area of the fleet and its radius may shrink or grow based on the dynamic environment and fleet size. In an implementation, the assignment may be done using, for example, a token or like system.

Figure 9:
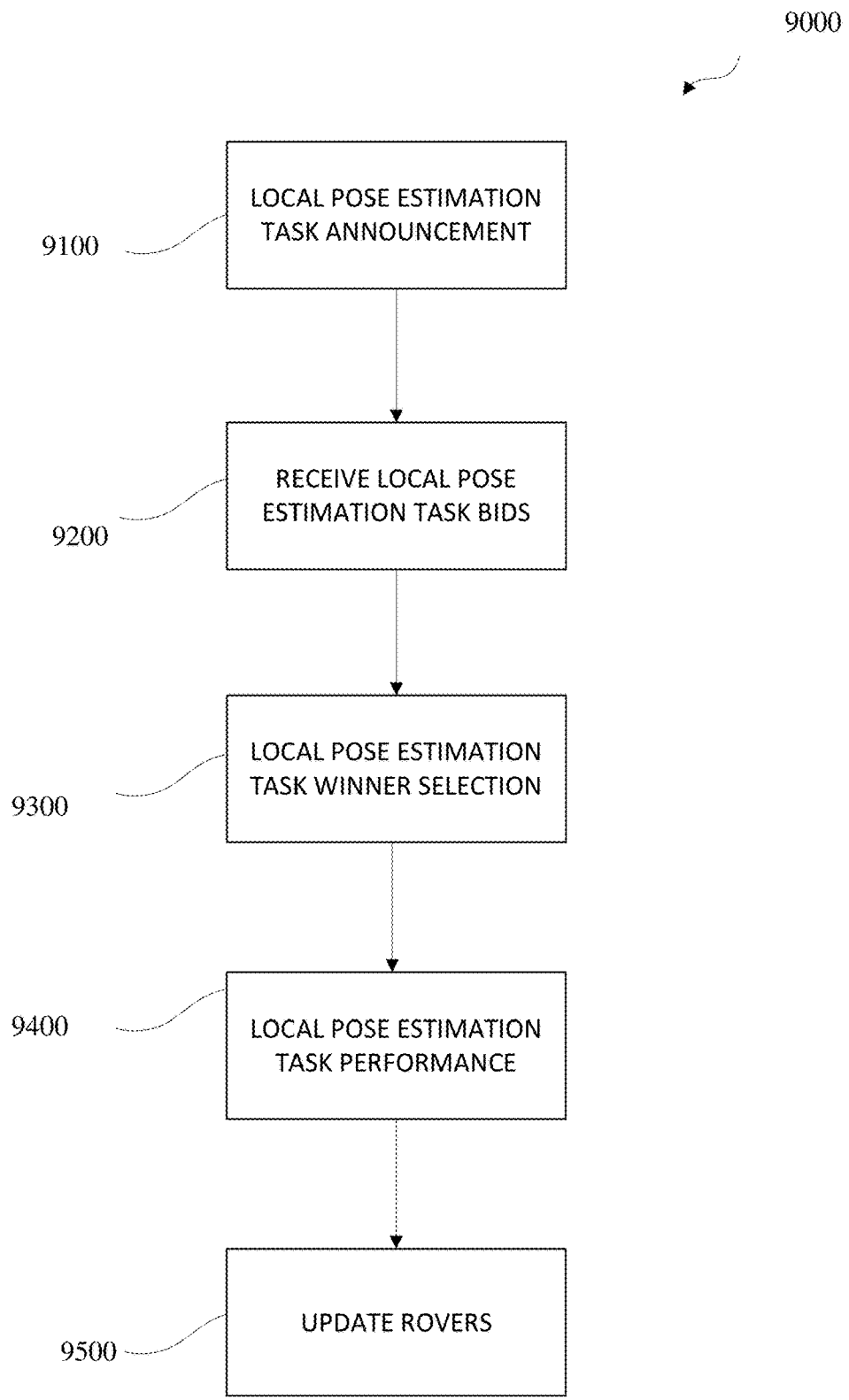
FIG. 9 is a flowchart of an example method for localization in accordance with embodiments of this disclosure.

FIG. 9 is a diagram of an example of a technique or method 9000 for localization in accordance with embodiments of this disclosure. The method 9000 includes: announcing 9100 a local pose estimate task triggered by the availability of relative measurements; receiving 9200 bids for the local pose estimate task; selecting 9300 a winning bid; performing 9400 the local pose estimation task; and updating 9500 the rovers in the rover cooperative with the appropriate pose or update command. For example, the technique 9000 may be implemented, as applicable and appropriate, by the localization unit 6215 of FIG. 6, the localization unit 6225 of FIG. 6, the localization device 5140 shown in FIG. 5, the navigation device 5090 shown in FIG. 5, the V2X 5160, the map 5120, the control system 1010 shown in FIG. 1, the processor 1020 shown in FIG. 1 or FIG. 2 or the processing unit 3010 shown in FIG. 3 or FIG. 4.

The method 9000 includes announcing 9100 a local pose estimation task triggered by the availability of relative measurements. In an implementation, the announcing 9100 may include selecting an auctioneer. In an implementation, the auctioneer may be randomly selected from members of a rover cooperative, where cooperative refers herein to a collection of rovers that are in communication with each other for the purposes of sharing localization data, position data, and the like, for cooperatively determining pose estimations or correction updates for each rover in the cooperative. For example, as shown in FIG. 10, the auctioneer may be assigned randomly inside the dashed circle 10100 of a rover cooperative 10000. Each node 10200 may represent a rover (an AV or passenger) in a cooperative or fleet and a link 10300 represents communication amongst the nodes. The dashed circle may represent a geometrical center area of the fleet and its radius may shrink or grow based on the dynamic environment and fleet size. In an implementation, the assignment may be done using, for example, a token or like system. In the event of a communication loss (determined relative to a threshold) due to computation delay or loss, communication delay or loss, or both, the auctioneer may be deemed unavailable or dead, and a new auctioneer may be assigned randomly. In an implementation, the auctioneer may be rotated amongst the members of the rover cooperative using, for example, a token or like system. In an implementation, the announcing 8100 may include collecting or gathering the information relevant to the local pose estimation task. For example, the auctioneer may offer tasks of the individual motion measurements, and rover-to-rover relative measurements in a bid package. The bidding package may also contain computation and communication capabilities required by a winning bidder. In an implementation, the computation and communication capabilities may account for communication delay and packet loss. In an implementation, the bid package may be sent in a message. In an implementation, the members of the rover cooperative may be known to each other using known techniques.

The method 9000 includes receiving 9200 bids for the local pose estimate task. In an implementation, the auctioneer may receive bids from rovers that meet requested criteria based on communication and computational requirements. The method 9000 includes preparing 9200 a bid for the local pose estimate task. The preparing 9200 may include accepting the bidding package or message by rovers that are in an idle or explore the state. Since the rover cooperative may comprise heterogeneous rovers that have different capabilities, each rover may compare their own capabilities with the capabilities required for the task. In an implementation, rovers capable of meeting the requirements bid on the local pose estimation task. After evaluating the cost, participating rovers may submit bids to the auctioneer.

The method 9000 includes selecting 9300 a winning bid. The auctioneer evaluates the submitted bids, announces the winner, and awards the task for local pose estimation which includes estimating the poses or generating update commands members (i.e., pose state correction) for the rovers in the cooperative. The auctioneer then closes the auction. In an implementation, the auctioneer may send a message identifying the winning bid. In an implementation, the other rovers may return to an explore state and start searching for new tasks.

The method 9000 includes performing 9400 the local pose estimation task. In an implementation, the task for local pose estimation which includes estimating poses or generating update commands (i.e., pose state correction) for the rovers in the cooperative. In an implementation, the auctioneer may monitor the progress of the winning bidder. That is, determining if the local pose estimate task is complete. In an implementation, the auctioneer monitors the progress of the winning rover. In an implementation, the auctioneer periodically sends messages to the winning rover until the auctioneer dies due to computation or/and communication delay or loss. In an implementation, the method may include determining the viability of the auctioneer. In an implementation, a determination is made as to whether there is a communication loss (determined relative to a threshold) with respect to a current auctioneer. The loss of communication may be due to one of or a combination of computation delay, computation loss, communication delay, communication loss, and the like. In an implementation, the method may include selecting a new auctioneer when a current auctioneer dies due to computation or/and communication delay or loss. In an implementation, the auctioneer may be randomly selected from members of a rover cooperative. For example, as shown in FIG. 10, the auctioneer may be assigned randomly inside the dashed circle 10100 of a rover cooperative 10000. Each node 10200 may represent a rover (an AV or passenger) in a cooperative or fleet and a link 10300 represents communication amongst the nodes. The dashed circle may represent a geometrical center area of the fleet and its radius may shrink or grow based on the dynamic environment and fleet size. In an implementation, the assignment may be done using, for example, a token or like system.

The method 9000 includes updating 9500 the rovers in the rover cooperative with the appropriate pose or update command. In an implementation, the completed local pose estimation task may be used to determine where to pick up a passenger in a parking lot or find a parked AV.

Figure 11:
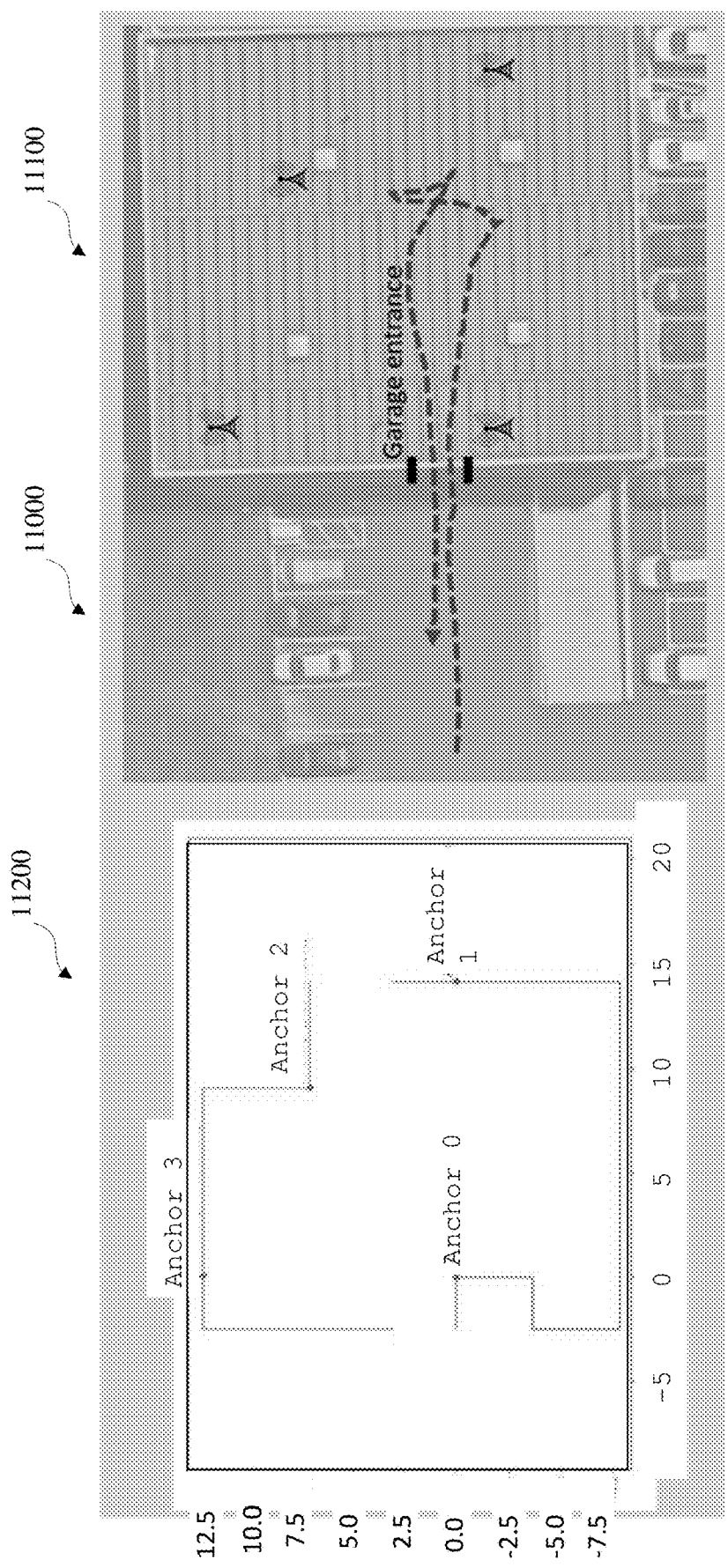
FIG. 11 is a photograph of an example localization result in accordance with embodiments of this disclosure.

FIG. 11 is a photograph of an example localization result in accordance with embodiments of this disclosure. FIG. 11 shows experimental results using GPS and UWB as signals for localization in an outdoor parking lot 11000 and indoor parking garage 11100 as shown for example in FIG. 12. Anchor positioning 11200 is also shown. Centimeter accurate localization is achieved using the localization signals onboard of the rover. As shown in FIG. 11 and FIG. 12, UWB anchors are placed in geometry in the garage so that their placement assures good coverage.

In general, a method for localization includes announcing by an auctioneer a local pose estimation task to a rover cooperative, where the rover cooperative includes a plurality of rovers and where each rover is one of autonomous vehicles and passengers with location/position determinable devices which are in communication for the purposes of sharing data to determine localization, and the auctioneer is one of the plurality of rovers. The at least one rover of the rover cooperative submit a local pose estimation task bid. The auctioneer selects a winning rover bidder. An AV controller is updated with information based on a determined local pose estimation or update command by the winning rover bidder. In an implementation, the method includes selecting the auctioneer from the rover cooperative by using at least one of random selection or rotation among the plurality of rovers in the rover cooperative. In an implementation, a local pose estimation task announcement is triggered by the availability of relative measurements and the auctioneer's announcement includes at least the relative measurements and required computation and communication capabilities. In an implementation, the relative measurements include at least signals of opportunity measurements. In an implementation, the method includes updating the plurality of rovers in the rover cooperative with determined location estimation pose or update command. In an implementation, the method includes monitoring the progress of the winning rover bidder by the auctioneer. In an implementation, the method includes determining the viability of the auctioneer based on communication loss and selecting another auctioneer on a condition of auctioneer death.

In general, a localization system includes a rover cooperative including a plurality of rovers which are in communication for the purposes of sharing data to determine localization, and where a rover is one of an autonomous vehicle (AV) and a passenger. The system includes an auctioneer, where the auctioneer is one of the plurality of rovers. The auctioneer is configured to announce a local pose estimation task to the rover cooperative, receive local pose estimation task bids from some rovers of the rover cooperative and select a winning rover bidder. The winning rover bidder is configured to update an AV controller with information based on a determined local pose estimation or update command. In an implementation, selection of the auctioneer is done by using at least one of random selection or rotation among the plurality rovers in the rover cooperative. In an implementation, a local pose estimation task announcement is triggered by the availability of relative measurements and the auctioneer's announcement includes at least the relative measurements and required computation and communication capabilities. In an implementation, the relative measurements include at least signals of opportunity measurements. In an implementation, the winning rover bidder is configured to update the plurality of rovers in the rover cooperative with their location estimation pose or update command. In an implementation, the auctioneer is configured to monitor the progress of the winning rover bidder. In an implementation, auctioneer viability is based on communication loss and another auctioneer is selected on a condition of auctioneer death.

In general, a method for localization includes selecting an auctioneer from a rover cooperative, where the rover cooperative includes rovers and where each rover is one of autonomous vehicles and passengers with location/position determinable devices which are in communication for the purposes of sharing data to determine localization. A local pose estimation task is triggered based on availability of relative measurements. The auctioneer announces a local pose estimation task to the rover cooperative. Local pose estimation task bids are submitted to the auctioneer. A winning rover bidder is selected by the auctioneer. Rovers in the rover cooperative are updated with determined local pose estimation or local pose state correction. In an implementation, the method includes selecting the auctioneer by using at least one of random selection or rotation among the rovers in the rover cooperative. In an implementation, an auctioneer's announcement includes at least the relative measurements and required computation and communication capabilities. In an implementation, the relative measurements include at least signals of opportunity measurements. In an implementation, the method includes monitoring the progress of the winning rover bidder by the auctioneer. In an implementation, the method includes determining the viability of the auctioneer based on communication loss, and selecting another auctioneer on a condition of auctioneer death.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for localization, the method comprising:
announcing by an auctioneer a local pose estimation task to a rover cooperative, wherein the rover cooperative includes a plurality of rovers and wherein each rover is one of autonomous vehicles and passengers with location/position determinable devices which are in communication for the purposes of sharing data to determine localization, and the auctioneer is one of the plurality of rovers;
submitting by at least one rover of the rover cooperative a local pose estimation task bid;
selecting by the auctioneer a winning rover bidder; and
updating an AV controller with information based on a determined local pose estimation or update command by the winning rover bidder,
wherein the local pose estimation task announcement is triggered by the availability of relative measurements and the auctioneer's announcement includes at least the relative measurements and required computation and communication capabilities.

2. The method of claim 1, the method further comprising:
selecting the auctioneer from the rover cooperative by using at least one of random selection or rotation among the plurality of rovers in the rover cooperative.

3. The method of claim 1, wherein the relative measurements include at least signals of opportunity measurements.

4. The method of claim 1, the method further comprising:
updating the plurality of rovers in the rover cooperative with determined location estimation pose or update command.

5. The method of claim 1, the method further comprising:
monitoring the progress of the winning rover bidder by the auctioneer.

6. The method of claim 5, the method further comprising:
determining the viability of the auctioneer based on communication loss; and
selecting another auctioneer on a condition of auctioneer death.

7. A localization system comprising:
a rover cooperative including a plurality of rovers which are in communication for the purposes of sharing data to determine localization, and wherein a rover is one of an autonomous vehicle (AV) and a passenger;
an auctioneer, wherein the auctioneer is one of the plurality of rovers, the auctioneer configured to:
announce a local pose estimation task to the rover cooperative;
receive local pose estimation task bids from some rovers of the rover cooperative; and
select a winning rover bidder; and
the winning rover bidder is configured to update an AV controller with information based on a determined local pose estimation or update command,
wherein auctioneer viability is based on communication loss and another auctioneer is selected on a condition of auctioneer death.

8. The localization system of claim 7, wherein selection of the auctioneer is done by using at least one of random selection or rotation among the plurality rovers in the rover cooperative.

9. The localization system of claim 7, wherein a local pose estimation task announcement is triggered by the availability of relative measurements and the auctioneer's announcement includes at least the relative measurements and required computation and communication capabilities.

10. The localization system of claim 8, wherein the relative measurements include at least signals of opportunity measurements.

11. The localization system of claim 7, wherein the winning rover bidder is configured to update the plurality of rovers in the rover cooperative with their location estimation pose or update command.

12. The localization system of claim 7, wherein the auctioneer is configured to monitor the progress of the winning rover bidder.

13. A method for localization, the method comprising:
   selecting an auctioneer from a rover cooperative, wherein the rover cooperative includes rovers and wherein each rover is one of autonomous vehicles and passengers with location/position determinable devices which are in communication for the purposes of sharing data to determine localization;
   triggering a local pose estimation task based on availability of relative measurements;
   announcing by the auctioneer a local pose estimation task to the rover cooperative;
   submitting local pose estimation task bids to the auctioneer;
   selecting a winning rover bidder by the auctioneer; and
   updating rovers in the rover cooperative with determined local pose estimation or local pose state correction.

14. The method of claim 13, the method further comprising:
   selecting the auctioneer by using at least one of random selection or rotation among the rovers in the rover cooperative.

15. The method of claim 13, wherein an auctioneer's announcement includes at least the relative measurements and required computation and communication capabilities.

16. The method of claim 15, wherein the relative measurements include at least signals of opportunity measurements.

17. The method of claim 13, the method further comprising:
   monitoring the progress of the winning rover bidder by the auctioneer.

18. The method of claim 17, the method further comprising:
   determining the viability of the auctioneer based on communication loss; and
   selecting another auctioneer on a condition of auctioneer death.

* * * * *